(12) United States Patent
Prior et al.

(10) Patent No.: US 6,874,486 B2
(45) Date of Patent: Apr. 5, 2005

(54) SUPERCHARGER WITH MULTIPLE BACKFLOW PORTS FOR NOISE CONTROL

(75) Inventors: Gregory P. Prior, Birmingham, MI (US); Roxann M. Bittner, Royal Oak, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/407,829

(22) Filed: Apr. 4, 2003

(65) Prior Publication Data

US 2004/0194766 A1 Oct. 7, 2004

(51) Int. Cl.[7] .............................................. F02B 33/00
(52) U.S. Cl. ................... 123/559.1; 418/15; 418/206.2; 418/201.2; 251/209; 137/625.32
(58) Field of Search .............................. 123/559.1, 564; 418/201.1, 1, 15, 206.4, 206.2, 201.2; 137/625.32; 251/209; 417/440, 310

(56) References Cited

U.S. PATENT DOCUMENTS

| | | | | |
|---|---|---|---|---|
| 1,746,885 A | * | 2/1930 | Bunge et al. ............. 418/206.4 |
| 3,058,652 A | * | 10/1962 | Glamann ................. 418/206.2 |
| 3,072,316 A | * | 1/1963 | Mossin ...................... 418/191 |
| 3,443,793 A | * | 5/1969 | Hulsey ....................... 251/209 |
| 3,879,938 A | * | 4/1975 | Rinker et al. ............... 123/249 |
| 4,212,321 A | * | 7/1980 | Hulsey ................... 137/625.32 |
| 4,609,335 A | * | 9/1986 | Uthoff, Jr. ................ 418/201.1 |
| 4,913,634 A | * | 4/1990 | Nagata et al. ........... 418/201.1 |
| 5,070,909 A | * | 12/1991 | Davenport ............. 137/625.32 |
| 5,131,829 A | * | 7/1992 | Hampton ................. 418/201.1 |
| 5,370,154 A | * | 12/1994 | Greer .................... 137/625.32 |
| 6,024,125 A | * | 2/2000 | Baumann ............... 137/625.32 |
| 6,056,804 A | * | 5/2000 | Keefer et al. ................... 95/96 |
| 6,589,034 B2 | * | 7/2003 | Vorwerk et al. .............. 418/15 |

FOREIGN PATENT DOCUMENTS

| | | | | |
|---|---|---|---|---|
| DE | 579 079 | * | 6/1933 | |
| EP | 0 225 070 A1 | * | 6/1987 | ................... 418/15 |

* cited by examiner

*Primary Examiner*—Thai-Ba Trieu
(74) *Attorney, Agent, or Firm*—Karl F. Barr, Jr.

(57) ABSTRACT

A supercharger includes multiple back flow ports which are controlled by valves. The valves regulate the timing and area for back flow of pressurized outlet air into the rotor chambers. The back flow air tends to equalize air pressure in the chambers prior to their exhausting into the outlet and thereby reduces flow back noise. The multiple ports are opened selectively or sequentially to provide noise control with improved efficiency at varying speeds.

9 Claims, 6 Drawing Sheets

SUPERCHARGER WITH MULTIPLE BACKFLOW PORTS FOR NOISE CONTROL

TECHNICAL FIELD

This invention relates to roots-type engine superchargers having backflow ports for reducing noise.

BACKGROUND OF THE INVENTION

Roots-type superchargers are used to pump air into an engine at a rate greater than natural aspiration. The air enters the supercharger at nearly atmospheric pressure. Rotors in the supercharger carry nearly atmospheric air to an outlet port where the air is pressurized for delivery to the cylinders of an engine. The discharge of the nearly atmospheric air into the pressurized outlet creates back flow noise in the form of a pneumatic report or pop. When repeated at the high frequency which is typical of supercharger operation, this series of reports becomes a whine.

Fixed back flow ports have been used to reduce noise by allowing a small amount of pressurized air to flow from the outlet of the supercharger into the nearly atmospheric rotor chambers. This tends to equalize the pressure between the outlet and the rotor chambers gradually so that when the rotor chambers exhaust, there is not as much energy in each pulse, thereby reducing noise. However, fixed ports can be optimized for only a small range of engine speeds. A small fixed port close to the outlet port can reduce noise at low engine speeds but, at a high engine speeds, small retarded ports are inadequate to equalize pressure between the outlet and the cavity, so that increased noise levels result. However, a large and advanced fixed port, used to quiet the supercharger at high speeds, will result in excessive back flow and reduced efficiency at lower engine speeds.

SUMMARY OF THE INVENTION

The present invention provides an improved supercharger using a plurality of graduated back flow ports to reduce supercharger noise, while maintaining supercharger efficiency. Valves regulate the amount and timing of back flow through a plurality of graduated ports. This allows pressure to equalize between the outlet of the supercharger and the chambers in the rotors of the supercharger throughout the engine operating range.

At low engine speeds, a small and retarded back flow port is adequate to equalize pressure between the outlet of the supercharger and the chambers of an associated rotor of the supercharger. As engine speed increases, larger and more advanced ports are substituted or added to advance the timing and increase the back flow rate to equalize the pressures and reduce noise.

As the engine approaches maximum speed, still larger and more advanced ports are substituted or added to increase the back flow rate and offset the shorter time for back flow caused by the increased rotor speed. Efficiency is maintained because the time for leakage of the back flow gas is also reduced. As the engine slows down, the leakage of back flow air from advanced ports becomes excessive, resulting in loss of efficiency. To maintain supercharger efficiency throughout operation, the valves close ports as needed to maintain equalized pressure between the cavity and the output of the supercharger.

These and other features and advantages of the invention will be more fully understood from the following description of certain specific embodiments of the invention taken together with the accompanying drawings.

DESCRIPTION OF THE PREFERRED EMBODIMENT

Figure 1:
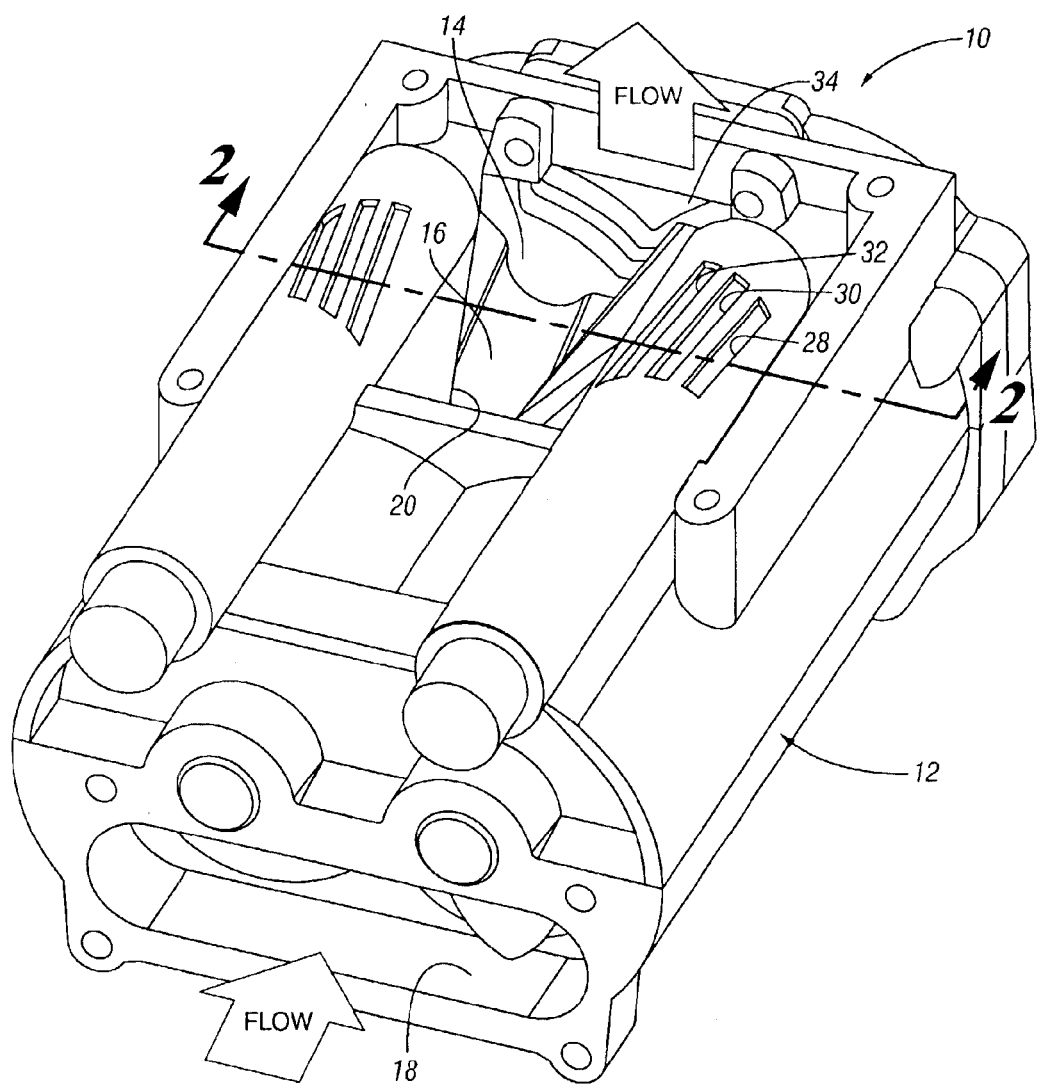
FIG. 1 is an isometric pictorial view of a first embodiment of supercharger according to the invention.

Referring to FIGS. 1–4 of the drawings in detail, numeral 10 generally indicates a roots-type engine supercharger having controllable back flow ports in accordance with the invention. Supercharger 10 includes a housing 12 having an internal cavity 14 in which a pair of three-lobed rotors 16 are rotatable in opposite directions as shown by the arrows in FIGS. 2–4. The lobes of the rotors preferably have a helical twist as they extend longitudinally in the housing in order to provide a relatively smooth discharge of air from the supercharger. However, such superchargers may also be made with other rotor configurations, such as straight rotors with two or more lobes.

Housing 12 includes an inlet opening 18 at one end of the housing, although such an opening could be provided on the lower side of the housing if desired for a particular application. A triangularly-shaped outlet opening 20 is provided toward the opposite end of the upper side of the housing, through which air drawn in through the inlet opening is discharged to the intake manifold of an associated engine, not shown. The outlet opening has angled sides arranged to generally match the helical angles of the impeller rotor lobes. In accordance with the invention, cylindrical valve bores 22 are provided along opposite sides of the outlet opening and include internal rotatable cylindrical valves 24, each having a transverse control slot 26 extending diametrically through its respective valve member.

Figure 2:
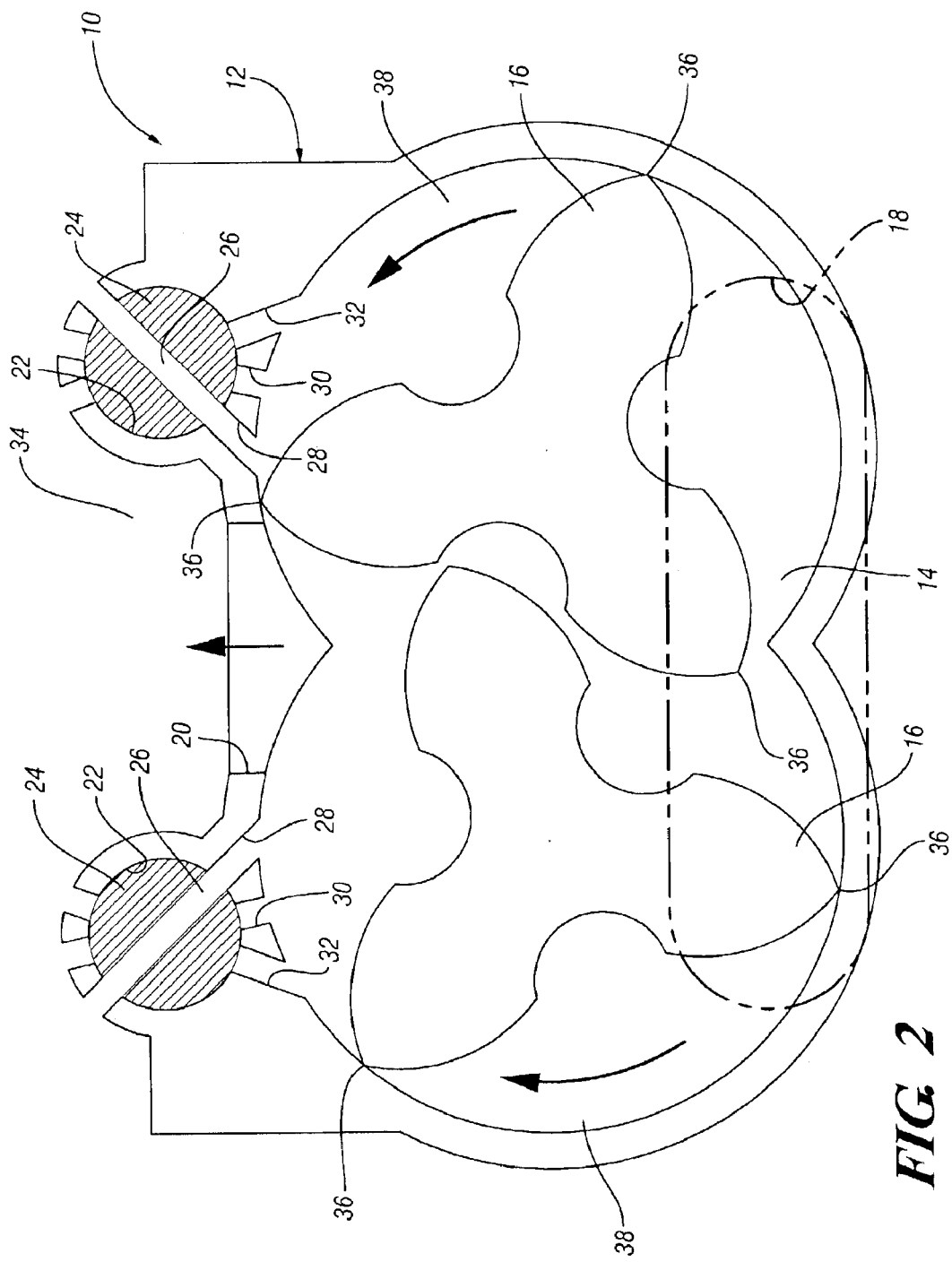
FIG. 2 is a cross-sectional view from line 2—2 of FIG. 1 showing a retarded back flow valve position.
Figure 3:
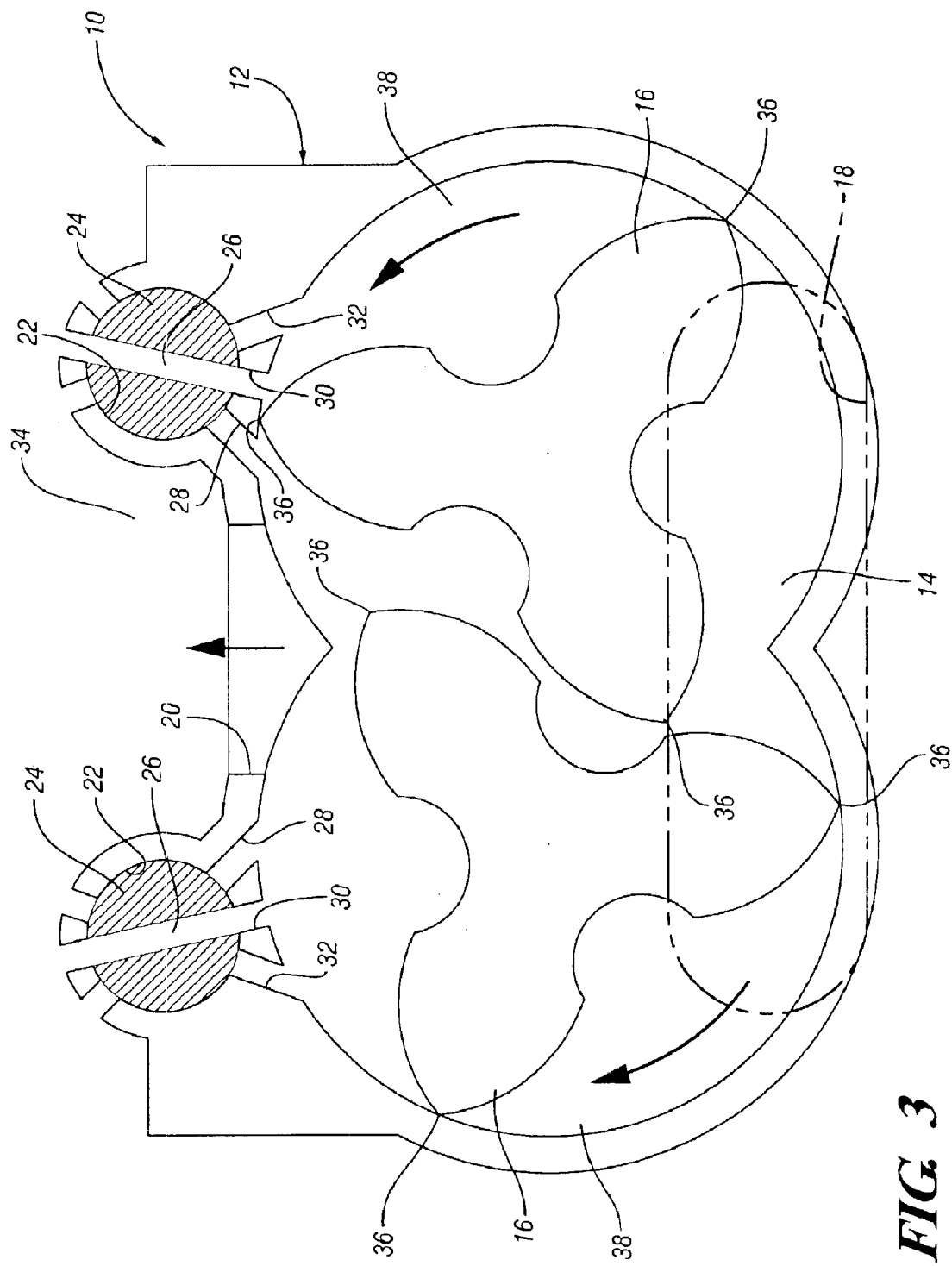
FIG. 3 is view similar to FIG. 2 showing an intermediate back flow valve position.
Figure 4:
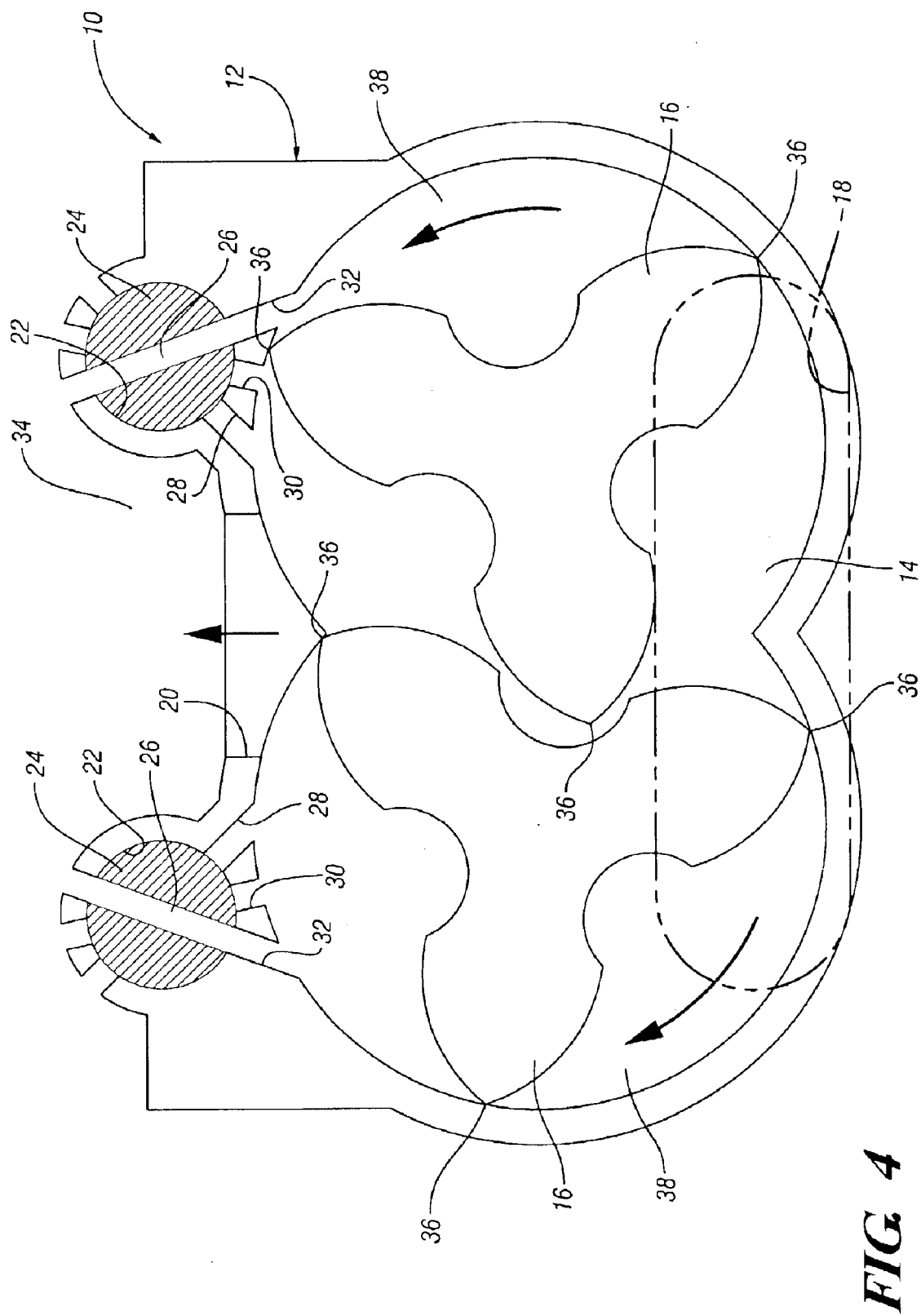
FIG. 4 is a view similar to FIG. 3 showing an advanced valve position.

As seen in FIGS. 2–4, the valves 24 control separate groups of outlet ports provided on opposite sides of the outlet opening 20. These ports include a relatively short retarded port 28 opening to the cavity 14 close to the adjacent outlet opening 20, an intermediate port 30 spaced from the retarded port 28 outward, away from the outlet opening 20, and a relatively long advanced port 32 spaced from the intermediate port further outward away from the outlet opening 20. The slots 26 in the valves 24 are rotatable to selectively connect with the various ports 28, 30, 32 adjacent the housing cavity 14. The slots also connect with outer ends of the ports, which extend outward through the opposite sides of the valve bores 22 to connect with a plenum 34 surrounding the outlet opening 20 and communicating with the associated engine intake manifold.

It should be noted that the lobes of rotors 16 have apexes 36 which rotate in close sealing relationship with the interior walls of the cavity 14. The recesses between the apexes define, with the cavity walls, internal chambers 38 which rotate with the rotors to carry air at atmospheric pressure from the inlet opening 18 to the outlet opening 20.

In operation, the supercharger rotors are driven through a mechanical connection with the engine at a rotational speed which varies as a function of engine speed. As the rotors rotate, ambient air is drawn in through the inlet opening 18 into the chambers 38 which are open to the lower portion of the housing 12. The chambers rotate with the rotors to carry the ambient air around the periphery of the housing cavity and discharge the ambient air through the outlet opening 20 to the plenum 34. The plenum is pressurized during engine operation because the supercharger is sized to deliver a greater volume of ambient air to the plenum 34 than can be drawn in by the naturally aspirated displacement of the associated engine. Thus, an outlet pressure from the supercharger is developed so that the air is compressed sufficiently to allow it to go through the engine at the same rate it is delivered by the supercharger, giving a resulting boost pressure at the engine intake.

Without the noise control ports 28, 30, 32, the opening of the chambers 38 to the pressurized outlet opening 20 would cause a reverse flow or back flow of pressurized air from the outlet 20 back into the connecting rotor chambers 38. This would equalize the pressure in the rotor chambers with that in the plenum 34 but would cause a distinctive popping sound which, at ordinary supercharge rotor speeds, results in a distinctive and objectionable whine.

In some engine applications, such as racing cars, the whine may be considered unimportant and is therefore ignored and noise control ports are not provided. However, in other engines, where noise is an important matter, fixed noise control ports are generally provided. For trucks, it is important to maintain maximum boost at lower engine speeds, so ports positioned similarly to the retarded ports 28 are commonly provided. These reduce the noise at lower engine speeds where high torque is important but do not provide much silencing at higher engine and supercharger rotor speeds.

On the other hand, for passenger cars where supercharger noise at higher speeds is considered more important, ports positioned similarly to advanced ports 32 are provided to reduce the supercharger noise when the engine speed is high. These ports are advanced to allow more time for back flow into the rotor chambers to raise the chamber pressure to that of the plenum before the chambers are directly connected with the outlet opening and plenum. However, this port position results in some loss of supercharger pressure through the advanced ports when the engine is running at lower speeds, since the rotor chambers are still partially open or nearly open to the inlet opening when the advanced ports are opened for the back flow pressure balancing operation.

The multiple valve ports 28, 30, 32 of the present invention improve the prior art supercharger arrangements by providing for greater reduction of supercharger whine noise while maintaining internal boost efficiency.

Referring to FIG. 2, the valves 24 are shown connected with the retarded ports 28 which are opened only shortly before the associated rotor chambers are opened to the outlet opening 20. At lower engine speeds, the valves are placed in these positions which provide adequate flow of pressurized air into the chamber 38 in the short interval from the time the ports 28 are opened to the time the chambers are discharged to opening 20. Efficiency is maintained because the chambers 38 are sealed from the inlet opening 18 during the time period when the back flow ports 28 are connected with the chambers 38.

As engine speed increases, the back flow through ports 28 becomes less effective since there is less time for air flow into the chambers 38 because of the increased rotor speed. Accordingly, the valves 24 are rotated to the positions shown in FIG. 3 to connect the intermediate ports 30 with the rotor chambers 38 at an advanced position further away from the opening 20. This gives greater time for air flow through the ports 30 into chambers 38 before the chambers are exhausted into the outlet opening 20. In addition, ports 30 are made somewhat larger by increasing their length so that air flows at a higher rate into the chambers, adding to the effectiveness of the back flow pressure balancing step. Efficiency is maintained because, with the greater rotor speed, there is less time for pressurized air to leak from the chambers 38 back to the inlet port and so the overall efficiency is maintained.

In like manner, as engine speeds increase toward a maximum, valves 24 are again rotated to connect the advanced ports 32 with the rotor chambers 38. The ports 32 are located at an angular position even further from the outlet port 20 so that the increase in rotor speed is offset somewhat by the opening of ports 32 at the earlier advanced position. Thus, adequate time is given for back flow from the outlet plenum 34 to the associated rotor chambers 38 to sufficiently equalize their pressure before opening to the outlet opening 20. Again, because of the high rotor speeds, loss of pressure to the inlet port is negligible and efficient operation of the supercharger is maintained at the higher speeds.

As a result, supercharger operation is maintained at an efficient level during all operating speeds of the engine and supercharger while at the same time back flow noise levels are substantially reduced at all operating speeds. Preferably, as shown in the drawings, the back flow ports are positioned to extend generally longitudinally but are angled to align with the apexes 34 of the rotors so that the ports are opened along their length at essentially the same position of the rotor in each case. Also, the more advanced ports are made the longest to provide the greatest possibility for rapid air flow during high speed operation of the rotor. The intermediate and retarded ports are made respectively shorter since, at the slower rotor speeds, they provide acceptable flow rates to accommodate the operating conditions of the supercharger.

It would, of course, be possible to provide other forms of rotary valves to connect with the spaced back flow ports in the housing if desired. The cylindrical ports illustrated have been selected as preferred arrangements because of the relative ease of manufacture of the cylindrical valve openings and the cross flow back flow port arrangements.

Figure 5:
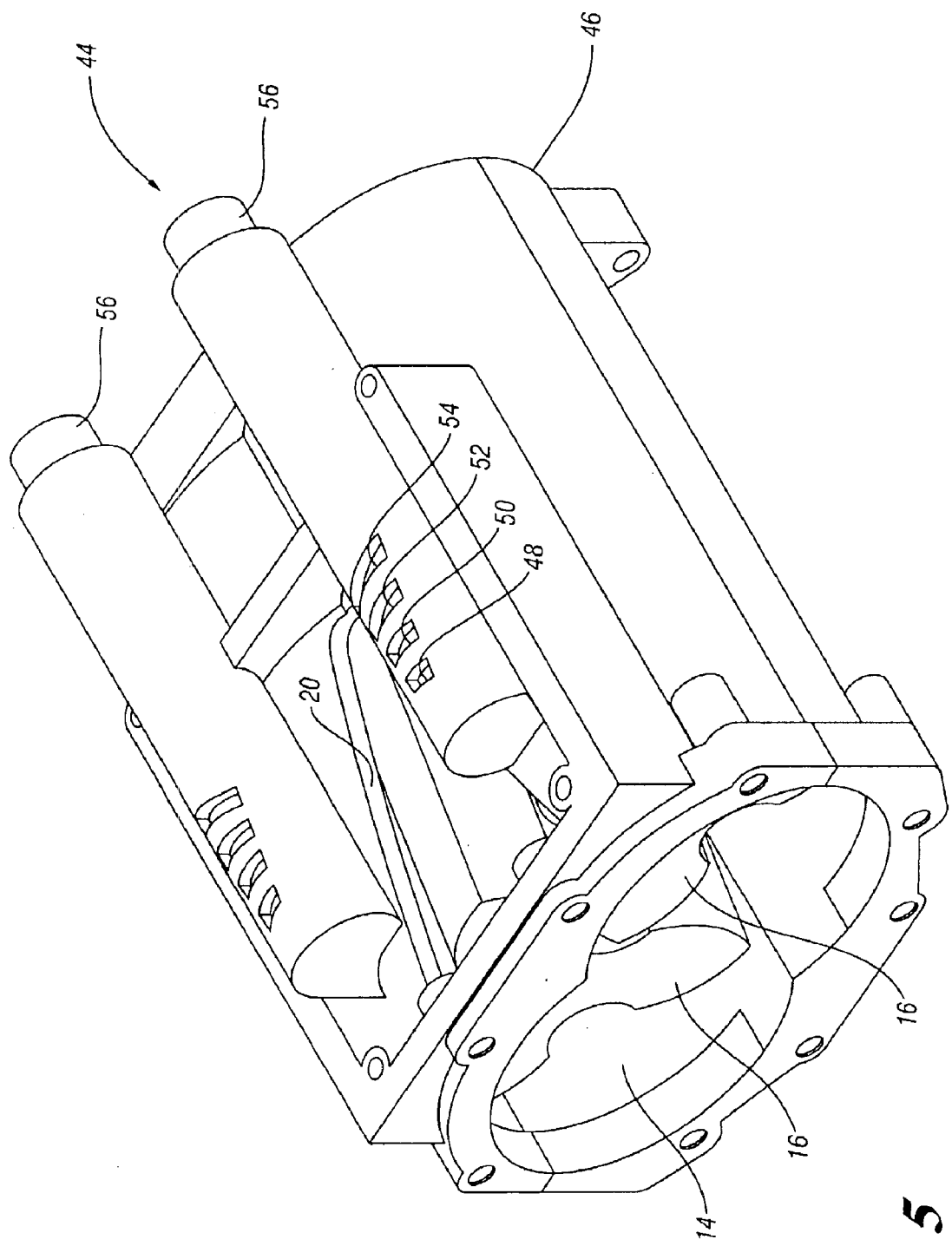
FIG. 5 is an isometric cross-sectional view of a supercharger with an alternative embodiment of back flow ports.
Figure 6:
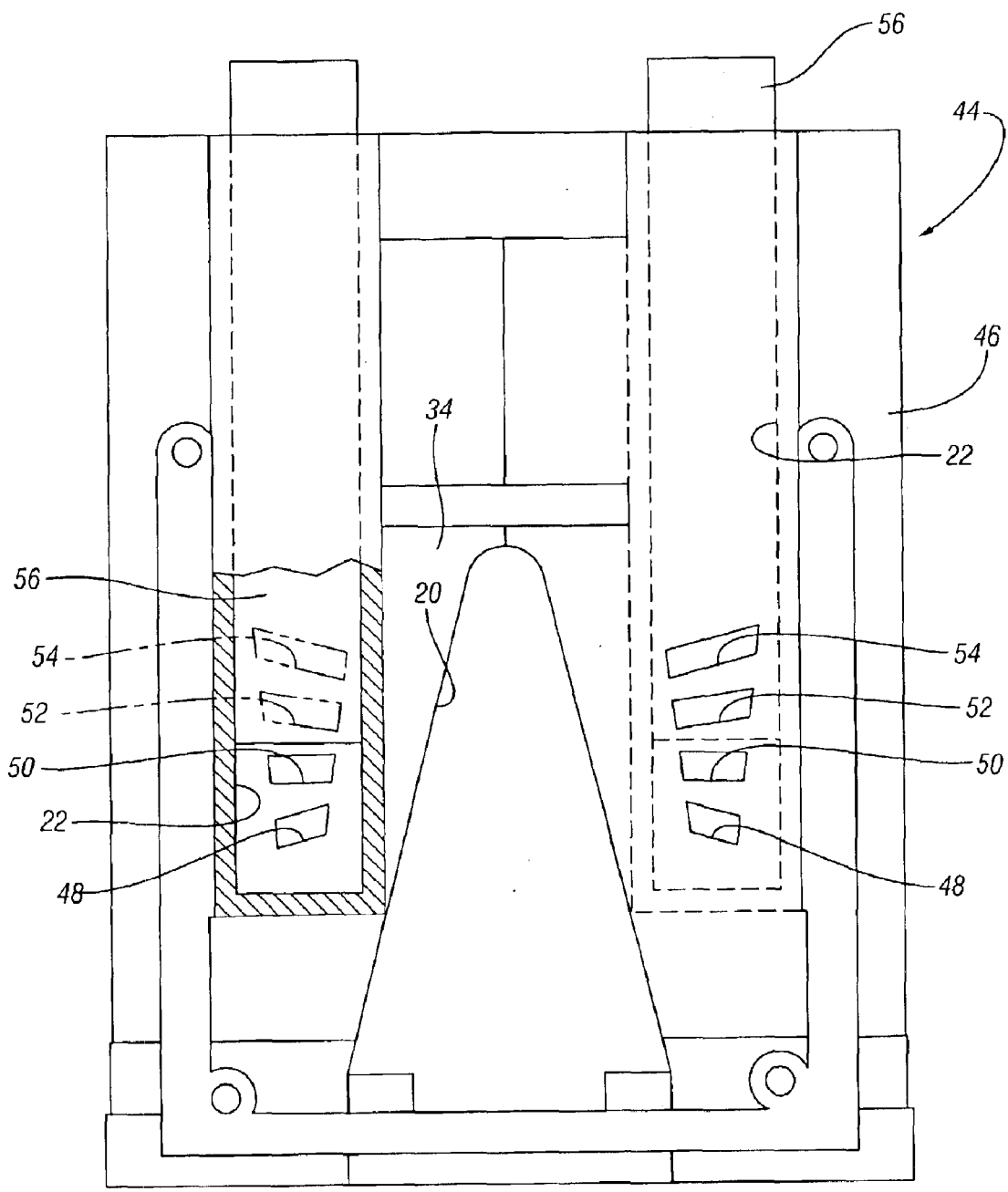
FIG. 6 is a plan view of the embodiment of FIG. 5 with portions broken away to show the inner housing ports.

Referring now to FIGS. 5 and 6 of the drawings, numeral 44 generally indicates an alternative embodiment of supercharger having back flow ports. Supercharger 44 is generally similar to supercharger 10 except for the form of the back flow ports and the valves for controlling them. Thus, the housing 46 is provided with a cavity 14, rotors 16, and inlet and outlet openings 18, 20 which are physically similar and operate in the same manner as those of supercharger 10.

The valve bores differ, however, with the provision of axially spaced graduated back flow ports 48, 50, 52, 54. These ports are directed generally circumferentially in the valve bores and range in size from the shortest retarded port 48 through intermediate ports 50, 52 to the longest advanced port 54. The timing of the ports is a result of their positioning relative to the phase angle distance from the angled outlet opening 20 of the supercharger as shown in FIG. 6. As before, the ports are made relatively longer from the retarded port to the advanced port in order to provide greater area for back flow through the more advanced ports to make up for the shorter time during which back flow may occur at the higher engine speeds.

Control of the back flow ports is provided by axially movable cylindrical slide valves 56 which are adjustable to close the ports or open them sequentially, starting with the retarded port 48 when operating at slow engine speeds. The intermediate ports 50, 52 are additionally opened as speeds increase and finally the advanced port 54 is opened at high engine speeds so that all of the ports are open for the passage of back flow air from the outlet plenum 34 to the associated rotor chambers 38 of the supercharger. As the number of open ports is increased, the area for back flow increases and the timing of the initial opening is advanced by opening of the more advanced ports.

In both of the embodiments described, operation of the valves, whether rotary or axial, may be accomplished by any suitable mechanism and control arrangement, for example by means of electronically controlled motorized actuators or other means as may be considered desirable and feasible. Also, other forms of valves and control devices could be substituted for those indicated with respect to the illustrated embodiments without departing from the concepts embodied in the invention as subsequently defined.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

What is claimed is:

1. A supercharger for an internal combustion engine comprising:
    a housing including a rotor cavity having an inlet and an outlet;
    a pair of positive displacement rotors oppositely rotatable in the rotor cavity and forming chambers to carry air from the inlet to the outlet;
    a plurality of back flow ports in the housing adjacent the outlet port and positioned to vary timing and port area; and
    a valve operable to regulate the port openings and timing of back flow through the ports.

2. A supercharger as in claim 1 wherein the valve is rotatably operable to selectively open the ports.

3. A supercharger as in claim 1 wherein the ports extend generally longitudinally and are circumferentially spaced to allow variable timing.

4. A supercharger as in claim 1 wherein the valve is an axially movable slide valve operable to open the ports sequentially and thereby regulate port area and timing of the ports.

5. A supercharger as in claim 1 wherein the ports extend generally circumferentially.

6. A supercharger for an internal combustion engine comprising:
    a housing including a rotor cavity having an inlet and an outlet;
    a pair of positive displacement rotors oppositely rotatable in the rotor cavity and forming chambers to carry air from the inlet to the outlet;
    a plurality of back flow ports in the housing adjacent the outlet port and positioned to vary timing and port area; and
    a valve operable to regulate the port openings and timing of back flow through the ports;
    wherein the ports extend generally longitudinally and are circumferentially spaced to allow variable timing; and
    the ports are angled in alignment with the rotor chambers and have varying lengths to accommodate variable flow rates.

7. A supercharger as in claim 6 wherein the valve is rotatably operable to selectively open the ports and thereby control port area and timing.

8. A supercharger for an internal combustion engine comprising:
    a housing including a rotor cavity having an inlet and an outlet;
    a pair of positive displacement rotors oppositely rotatable in the rotor cavity and forming chambers to carry air from the inlet to the outlet;
    a plurality of back flow ports in the housing adjacent the outlet port and positioned to vary timing and port area; and a valve operable to regulate the port openings and timing of back flow through the ports;
    wherein the ports extend generally circumferentially; and
    the ports are graduated, having varying lengths and positions for controlling timing and flow area.

9. A supercharger as in claim 8 wherein the valve is a cylindrical slide valve operable to open the ports sequentially and thereby regulate port area and timing of the ports.

* * * * *